US010287387B2

(12) United States Patent
Miyatake

(10) Patent No.: US 10,287,387 B2
(45) Date of Patent: May 14, 2019

(54) EPOXY RESIN COMPOSITION FOR CASTING

(71) Applicant: KANEKA CORPORATION, Osaka-shi (JP)

(72) Inventor: Nobuo Miyatake, Takasago (JP)

(73) Assignee: KANEKA CORPORATION, Osaka-shi (JP)

( * ) Notice: Subject to any disclaimer, the term of this patent is extended or adjusted under 35 U.S.C. 154(b) by 47 days.

(21) Appl. No.: 15/505,992

(22) PCT Filed: Sep. 2, 2015

(86) PCT No.: PCT/JP2015/074917
§ 371 (c)(1),
(2) Date: Feb. 23, 2017

(87) PCT Pub. No.: WO2016/039232
PCT Pub. Date: Mar. 17, 2016

(65) Prior Publication Data
US 2017/0275413 A1    Sep. 28, 2017

(30) Foreign Application Priority Data

Sep. 11, 2014   (JP) .................................. 2014-185608

(51) Int. Cl.

| | | |
|---|---|---|
| B32B 27/38 | (2006.01) | |
| B32B 27/26 | (2006.01) | |
| B32B 27/20 | (2006.01) | |
| B32B 27/04 | (2006.01) | |
| C08G 59/42 | (2006.01) | |
| C08G 59/62 | (2006.01) | |
| C08L 63/00 | (2006.01) | |
| C08G 59/02 | (2006.01) | |
| C08K 3/36 | (2006.01) | |
| C08K 5/09 | (2006.01) | |
| C08L 51/00 | (2006.01) | |
| C08L 71/02 | (2006.01) | |
| C01B 33/12 | (2006.01) | |
| C08G 65/00 | (2006.01) | |

(52) U.S. Cl.
CPC .............. *C08G 59/02* (2013.01); *C01B 33/12* (2013.01); *C08G 59/42* (2013.01); *C08G 65/00* (2013.01); *C08K 3/36* (2013.01); *C08K 5/09* (2013.01); *C08L 51/00* (2013.01); *C08L 63/00* (2013.01); *C08L 71/02* (2013.01)

(58) Field of Classification Search
None
See application file for complete search history.

(56) References Cited

U.S. PATENT DOCUMENTS

| 5,053,476 | A | 10/1991 | Akutagawa et al. |
| 5,223,598 | A | 6/1993 | Yamada et al. |
| 5,872,163 | A | 2/1999 | Hollstein et al. |
| 6,030,713 | A | 2/2000 | Hollstein et al. |
| 6,111,015 | A | 8/2000 | Eldin et al. |
| 2004/0039084 | A1 | 2/2004 | Beisele |
| 2007/0129502 | A1 | 6/2007 | Kawabe et al. |
| 2010/0227951 | A1* | 9/2010 | Clifford ................... C08K 3/36 523/442 |
| 2011/0115488 | A1* | 5/2011 | Groeppel ............... B82Y 30/00 324/318 |
| 2011/0319523 | A1 | 12/2011 | Ji et al. |
| 2015/0183976 | A1* | 7/2015 | Banda ..................... C08L 63/00 428/195.1 |

FOREIGN PATENT DOCUMENTS

| EP | 0 348 193 A2 | 12/1989 |
| JP | 2-117914 A | 5/1990 |
| JP | 6-157715 A | 6/1994 |
| JP | 2613330 B2 | 5/1997 |
| JP | 11-279262 A | 10/1999 |
| JP | 2001-40191 A | 2/2001 |
| JP | 2004-522816 A | 7/2004 |
| JP | 2005-255822 A | 9/2005 |
| JP | 2006-89683 A | 4/2006 |
| JP | 4416046 B1 | 2/2010 |
| JP | 2012-519761 A | 8/2012 |
| WO | WO 96/01481 A1 | 1/1996 |
| WO | 2013/011832 A1 | 1/2013 |

OTHER PUBLICATIONS

International Search Report dated Nov. 24, 2015 in PCT/JP2015/074917 filed Sep. 2, 2015.
Extended European Search Report dated Apr. 6, 2018 in European Patent Application No. 15839746.3 citing documents AP-AR, therein, 8 pages.

* cited by examiner

*Primary Examiner* — Michael J Feely
(74) *Attorney, Agent, or Firm* — Oblon, McClelland, Maier & Neustadt, L.L.P.

(57) ABSTRACT

The object of the present invention is to provide an epoxy resin composition for casting having excellent heat resistance and thermal shock resistance. The epoxy resin composition for casting of the present invention contains a silica powder (A), a liquid epoxy resin (B), a polyether polyol (C), a liquid acid anhydride (D), a curing accelerator (E), and a core shell polymer (F).

18 Claims, No Drawings

EPOXY RESIN COMPOSITION FOR CASTING

TECHNICAL FIELD

The present invention relates to an epoxy resin composition for casting and a cured product formed therefrom, which is excellent thermal shock resistance and is appropriate for insulation of electric equipment and the like.

BACKGROUND ART

Conventionally, an epoxy resin composition for casting has been used to insulate and protect coils or motors incorporated in electrical or electronic equipment, and electric conductors of solid insulated switching device.

Generally, the epoxy resin composition for casting contains an epoxy resin, a curing agent, and silica. In the case where the epoxy resin composition contains silica, the epoxy resin composition has a lower thermal expansion coefficient, and the difference between the thermal expansion coefficient of the epoxy resin composition and the thermal expansion coefficient of a metal part to be insulated and protected becomes small.

As a result, stress generated between the metal part and the epoxy resin composition also becomes small, so that crack hardly generates.

Recently, the thermal shock resistance in addition to the heat resistance has been required for the epoxy resin composition for casting due to high voltage loading, preparation of thinning material such as miniaturization and weight reduction in casted products. However, the thermal shock resistance always has no relation to the impact resistance.

Therefore, it is difficult to improve the thermal shock resistance, and various studies have been carried out. For example, Patent Document 1 discloses that a composition contains an epoxy resin, silica, and a polyether polyol having molecular weight of 1000 or less, and the composition has effects on internal stress relaxation. However, the thermal shock resistance cannot be sufficiently improved in the cured product formed from the composition of Patent Document 1.

Patent Document 2 discloses that a composition contains a liquid type butadiene and acrylonitrile rubber (CTBN) having a carboxylic acid at terminal together with silica in a large amount and a polypropylene glycol having molecular weight of 1000. While the composition of Patent Document 2 has the improved thermal shock resistance to some degree, the thermal shock resistance is still insufficient and the heat resistance is greatly decreased.

Patent Document 3 discloses that a composition contains an epoxy resin, a core-shell polymer, and a polyol. However, in Patent Document 3, the polyol is described as in the same manner as a curing agent, and there are no descriptions of the purpose to be used and effects thereof. Actually, even if the composition is prepared based on Patent Document 3, it is difficult to prepare a cured product having excellent thermal shock resistance.

PRIOR ART

Patent Document

Patent Document 1: JP Hei 2-117914
Patent Document 2: JP Hei 11-279262
Patent Document 3: JP Hei 6-157715

SUMMARY OF THE INVENTION

Problem to be Solved by the Invention

According to many studies by the present inventors, when a liquid epoxy resin and a silica powder are used for metals having a complicated shape, even if a polyether polyol and a core shell polymer are added separately, the thermal shock resistance is hardly improved compared to the case of no addition of the polyether polyol and the core shell polymer.

Thus, the object of the present invention is to provide an epoxy resin composition for casting having improved heat resistance and thermal shock resistance. The other object of the present invention is to provide a cured product formed from the epoxy resin composition.

Means for Solving the Problems

As a result of intensive studies in order to solve the above problems, the present inventors have found that the problem is solved by an epoxy resin composition for casting containing a silica powder (A), a liquid epoxy resin (B), a polyether polyol (C), a liquid acid anhydride (D), a curing accelerator (E), and a core shell polymer (F), to complete the present invention.

That is, the present invention relates to an epoxy resin composition for casting containing a silica powder (A), a liquid epoxy resin (B), a polyether polyol (C), a liquid acid anhydride (D), a curing accelerator (E), and a core shell polymer (F).

An amount of the polyether polyol (C) is preferably from 10 to 30 parts by weight per 100 parts by weight of the liquid epoxy resin (B).

The polyether polyol (C) is preferably polyoxyalkylene diol.

The polyether polyol (C) is preferably selected from polypropylene glycol and polytetramethylene glycol.

The polyether polyol (C) is preferably polypropylene glycol.

The polyether polyol (C) preferably has an average molecular weight of from 400 to 5000.

The polyether polyol (C) preferably contains a polyether polyol (C1) having an average molecular weight of not less than 400 and less than 2500 and a polyether polyol (C2) having an average molecular weight of not less than 2500 and not more than 5000.

The polyether polyol (C2) is contained in an amount of preferably from 50 to 90% by weight per 100% by weight of the sum of the polyether polyol (C1) and the polyether polyol (C2).

It is preferable that an amount of a core layer of the core shell polymer (F) is from 80 to 95% by weight, and a methyl ethyl ketone insoluble content in the core shell polymer is 95% by weight or more.

It is preferable that the core layer of the core shell polymer (F) is selected from the group consisting of diene rubber, siloxane rubber, and (meth)acrylate rubber.

It is preferable that particles of the core shell polymer (F) are dispersed as primary particles.

It is preferable that an amount of the silica powder (A) is from 40 to 85% by weight per 100% by weight of the sum of the silica powder (A), the liquid epoxy resin (B), the polyether polyol (C), the liquid acid anhydride (D), the curing accelerator (E), and the core shell polymer (F).

It is preferable that an amount of the core shell polymer (F) is from 0.3 to 10% by weight per 100% by weight of the sum of the silica powder (A), the liquid epoxy resin (B), the polyether polyol (C), the liquid acid anhydride (D), the curing accelerator (E), and the core shell polymer (F).

Also, the present invention encompasses a cured product formed from the epoxy resin composition for casting.

An embodiment of the present invention includes a coil protected with the cured product formed from the epoxy resin composition for casting, and an electrical or electric equipment containing the coil. Another embodiment of the present invention encompasses a solid insulated switching device containing an electric insulating part which is the cured product formed from the epoxy resin composition for casting.

Effect of the Invention

The cured product formed from the epoxy resin composition for casting of the present invention exhibits improved heat resistance and thermal shock resistance.

MODE FOR CARRYING OUT THE INVENTION

The epoxy resin composition for casting of the present invention contains a silica powder (A), a liquid epoxy resin (B), a polyether polyol (C), a liquid acid anhydride (D), a curing agent (E), and a core shell polymer (F). The polyether polyol conventionally has been used to decrease a viscosity of the composition in the casting application, and the polyether polyol hardly has effects on the improvement of the thermal shock resistance. In addition, the core shell polymer conventionally has been used to improve the thermal shock resistance, and the thermal shock resistance hardly has been improved by only core shell polymer. Further, when the core shell polymer is added to the silica powder (A) and the liquid epoxy resin (B), effects for improving the thermal shock resistance are insufficient.

Surprisingly, the present invention has a feature that when a given polyether polyol selected from some polyols is combined with a core shell polymer, the thermal shock resistance is remarkably improved compared to insufficient thermal shock resistance in the case of the addition of either the polyether polyol or the core shell polymer.

Unexpectedly, when the core shell polymer is used with preferably one or more polyether polyols having a given molecular weight range, and more preferably two polyether polyols having a given molecular weight range and a different molecular weight in an appropriate ratio, the thermal shock resistance is synergistically improved and the heat resistance is not impaired largely. Hereinafter, the epoxy resin composition for casting of the present invention is explained in detail.

<Silica Powder (A)>

The silica powder (A) of the present invention is used to decrease the thermal expansion coefficient and to improve the toughness in the cured product formed from the epoxy resin composition for casting.

The amount of the silica powder(A) of the present invention is preferably from 40 to 85% by weight per 100% by weight of the sum of the silica powder (A), the liquid epoxy resin (B), the polyether polyol (C), the liquid acid anhydride (D), the curing agent (E), and the core shell polymer (F). The amount of the silica powder (A) is more preferably from 40 to 80% by weight, even preferably from 50 to 75% by weight, and particularly preferably from 60 to 70% by weight, per 100% by weight of the sum of the silica powder (A), the liquid epoxy resin (B), the polyether polyol (C), the liquid acid anhydride (D), the curing agent (E), and the core shell polymer (F), in the viewpoint of the molding property by casting. When the amount of the silica powder (A) is large, the epoxy resin composition has a high viscosity, so that the casting is hardly carried out. On the other hand, when the amount of the silica powder (A) is small, the thermal shock resistance is decreased.

The weight average particle size (median diameter D50) of the silica powder (A) of the present invention is preferably from 3 to 50 μm, more preferably from 5 to 40 μm, and particularly preferably from 5 to 30 μm. When the weight average particle size of the silica powder (A) is less than 3 μm, the epoxy resin composition has a high viscosity, so that the casting becomes difficult. On the other hand, when the weight average particle size of the silica powder (A) is more than 50 μm, the dispersion stability of the silica powder (A) in the epoxy resin composition is deteriorated. Two or more silica powders having different particle sizes may be used. The particle size can be measured using a laser diffraction scattering-type particle size/particle size distribution measuring apparatus (e.g. MICROTRAC MT 3000 Series manufactured by NIKKISO CO., LTD.), a scanning electron microscope, and the like.

Examples of the silica powder (A) include spherical fused silica, fused crushed silica and crystalline silica. Crystalline silica is preferable in the viewpoint of the viscosity and toughness of the epoxy resin composition. Examples of the spherical fused silica include commercial products such as FB-5D, FB-12D and FB-20D manufactured by Denki Kagaku Kabushiki Kaisha (Denka Company Limited), examples of the fused crushed silica include commercial products such as FUSELEX Series manufactured by TATSUMORI LTD., and examples of the crystalline silica include commercial products such as CRYSTALITE Series manufactured by TATSUMORI LTD. and MILLISIL Series manufactured by SIBELCO N.V.

It is preferable to dry the silica powder (A) at 100 to 150° C. before use, in order to decrease the amount of bubbles in a cured product formed from the epoxy resin composition for casting.

<Liquid Epoxy Resin (B)>

As the liquid epoxy resin (B) of the present invention, any liquid epoxy resin (B) can be used as long as it has two or more epoxy groups in the molecule. For example, liquid epoxy resins such as glycidyl ether-type epoxy resins such as bisphenol A diglycidyl ether and bisphenol F diglycidyl ether; cycloaliphatic epoxy resins such as 3,4-epoxycyclohexylmethyl carboxylate and 1,4-cyclohexanedimethanol diglycidyl ether; linear-aliphatic epoxy resins such as 1,4-butanediol diglycidyl ether, 1,6-hexanediol diglycidyl ether and polypropylene glycol diglycidyl ether; and glycidyl ester-type epoxy resins such as hexahydrophthalic acid glycidyl esters can be used. The preferred liquid epoxy resin (B) is a glycidyl ether-type epoxy resin.

Besides these liquid epoxy resins (B), solid or semisolid polyfunctional epoxy resins such as polysiloxane-type epoxy resins having an epoxy group at the end or side chain of polydimethylsiloxane, phenol novolac-type epoxy resins, cresol novolac-type epoxy resins, triphenyl glycidyl ether methane resins, tetraphenyl glycidyl ether methane resins, brominated phenol novolac-type epoxy resins, dicyclopentadiene novolac-type epoxy resins and naphthol novolac-type epoxy resins can be used.

The liquid epoxy resins and the solid or semisolid polyfunctional epoxy resins can be used individually, or in combination. Also, in view of injection workability, these epoxy resins are combined in such a manner that an injected material is in the form of liquid. For example, when a liquid bisphenol A diglycidyl ether and a solid cresol novolac-type epoxy resin are mixed, and the amount of the polyfunctional epoxy resin such as the cresol novolac-type epoxy resin is 30% by weight or more, the viscosity of a casted material increases, leading to deterioration of workability. Therefore, the amount of the cresol novolac-type epoxy resin can be less than 30% by weight. Where the total amount of the liquid epoxy resin (B) and the solid or semisolid polyfunctional epoxy resin is 100% by weight, the amount of the liquid epoxy resin (B) is, for example, from 70 to 100% by weight, preferably from 80 to 100% by weight, more preferably from 90 to 100% by weight, and particularly preferably 100% by weight.

A reactive diluent having one epoxy group in the molecule may be added to the liquid epoxy resin (B). A reactive diluent having one or more reactive groups other than an epoxy group, for example, hydroxyl groups or carboxylic acid groups, in the molecule may be used if necessary. The reactive diluent has effects of reducing the viscosity of the epoxy resin composition for casting. Preferably, the reactive diluent is used in an amount of up to 45 parts by weight per 100 parts by weight of the liquid epoxy resin. When the reactive diluent is used in an excessive amount, the heat resistance of a cured product is lowered.

The reactive diluent having one epoxy group in the molecule includes alkyl monoglycidyl ether such as alkyl glycidyl ether having the carbon atoms of 8 to 14 such as butyl glycidyl ether, 2-ethyl hexyl glycidyl ether, phenol monoglycidyl ether such as phenyl glycidyl ether, nonyl phenyl glycidyl ether, and the like. These reactive diluents may be used in the combination of two or more reactive diluents.

Concrete examples of the reactive diluent having one or more hydroxyl groups or carboxylic groups in the molecule include silicon oil having a carboxylic group or a hydroxyl group. The reactive diluent may be used in the combination of two or more kinds. The reactive diluent may be mixed before use with a liquid acid anhydride as set for the below.

The amount of the liquid epoxy resin (B) is preferably 10% by weight or more and less than 50% by weight, more preferably 12% by weight or more and 40% by weight or less, and even preferably 15% by weight or more and 30% by weight or less, per 100% by weight of the epoxy resin composition.

<Polyether Polyol (C)>

The polyether polyol (C) is a compound having multiple ether bonds in the main chain and a hydroxyl group at terminal such as polyalkylene glycol such as polypropylene glycol, polytetramethylene glycol, and the like. The polyether polyol (C) is obtained by ring-opening polymerizing ethylene oxide, propylene oxide, butylene oxide, styrene oxide and the like under the presence of one or two or more active hydrogen-containing initiator (s), and a mixture thereof. The active hydrogen-containing initiator includes diols such as ethylene glycol, diethylene glycol, propylene glycol, dipropylene glycol, 1,3-butane diol, 1,4-butane diol, 1,6-hexane diol, neopentyl glycol, bisphenol A; triols such as trimethylol ethane, trimethylol propane, glycerin; tetraols such as diglycerin, pentaerythritol; sugars such as monosaccharide, oligosaccharide, polysaccharide; sorbitol; amines such as, ammonia, ethylenediamine, urea, monomethyldiethanol amine, monoethyldiethanol amine. The polyether polyol may be a polymer synthesized by condensation of ethylene glycol, propylene glycol, 1,4-butane diol, neopentyl glycol, and the like. The polyether polyol may be a random or block copolymer and the like obtained by using multiple components at the time of synthesis.

The polyether polyol (C) is preferably polyoxyalkylene diols such as polyethylene glycol, polypropylene glycol, polytetramethylene glycol; more preferably compounds having three or more functional groups such as polyoxypropylene glyceryl ether and the like, polyoxyalkylene triol such as polyoxyethylene triol, polyoxypropylene triol, and polyoxy(propylene and ethylene) copolymerized triol in which the above-mentioned polyoxyalkylene diol at one terminal thereof is bonded via ether bond with an alcohol having three or more functional groups such as triols such as trimethylolethane, trimethylolpropane, glycerin; tetraols such as diglycerin, pentaerythritol, and the above-mentioned polyoxyalkylene diol has an reacted hydroxyl group at another terminal thereof.

The polyether polyol (C) is preferably polyols having polyoxyalkylene unit, and more preferably polyoxyalkylene diol such as polypropylene glycol, polytetramethylene glycol, and the like in the view of the thermal shock resistance. The polyether polyol (C) is particularly preferably polypropylene glycol in the view of the thermal shock resistance and the handling at a lower viscosity.

The average molecular weight of the polyether polyol (C) of the present invention is the number average molecular weight calculated on the basis of polystyrene in GPC. The polyether polyol (C) has an average molecular weight of preferably from 400 to 5000, and more preferably from 1000 to 4000 in the view of the thermal shock resistance and easy handling.

The polyether polyol (C) of the present invention is preferably used in one kind or two or more kinds from polyether polyols satisfying the average molecular weight as mentioned above, more preferably used in one kind or two or more kinds of polyether polyols selected from a polyether polyol (C1) having an average molecular weight of not less than 400 and less than 2500 and a polyether polyol (C2) having an average molecular weight of not less than 2500 and not more than 5000, and even preferably used in the combination of the polyether polyol (C1) and the polyether polyol (C2). The polyether polyol (C1) has an average molecular weight of preferably from 400 to 2000, more preferably from 800 to 2000, and particularly preferably from 1000 to 2000. The polyether polyol (C2) has an average molecular weight of preferably from 2500 to 4500, and more preferably from 3000 to 4000.

In the combination of the polyether polyol (C1) with the polyether polyol (C2), a weight ratio of the polyether polyol (C1) to the polyether polyol (C2), that is, the weight ratio of (C1)/(C2) may be satisfied in the following range. The polyether polyol (C2) is contained in an amount of preferably from 20 to 90% by weight, more preferably from 50 to 90% by weight, and even preferably from 60 to 85% by weight, per 100% by weight of the sum of the polyether polyol (C1) and the polyether polyol (C2) in the view of the thermal shock resistance.

The polyether polyol such as the polyether polyol (C1) and the polyether polyol (C2) may be contained in the above weight ratio in the composition. A method for mixing the polyether polyol in the epoxy resin composition is not particularly limited. In the combination of the polyether polyol (C1) with the polyether polyol (C2), the polyether polyol (C1) and the polyether polyol (C2) may be mixed before use, and the polyether polyol (C1) and the polyether polyol (C2) may be sequentially mixed with other composition.

The amount of the polyether polyol (C) is preferably from 5 to 40 parts by weight, more preferably from 10 to 30 parts by weight, and even preferably from 10 to 25 parts by weight, per 100 parts by weight of the liquid epoxy resin (B) in the view of the thermal shock resistance. In the case the where the polyether polyol (C) is used in a smaller amount, the thermal shock resistance is not sufficiently exhibited in some cases. In the case where the polyether polyol (C) is used in a larger amount, the heat resistance is lowered in some cases.

<Liquid Acid Anhydride (D)>

The liquid acid anhydride (D) of the present invention is used as a curing agent for the liquid epoxy resin (B). Examples of the liquid acid anhydride (D) include phthalic anhydride, tetrahydrophthalic anhydride, hexahydrophthalic anhydride, methyltetrahydrophthalic anhydride, methylhexahydrophthalic anhydride, methylnadic anhydride, dodecylsuccinic anhydride, chlorendic anhydride, trialkyltetrahydrophthalic anhydrides, glycerol-tris(anhydrotrimellitate), trialkyltetrahydrophthalic anhydride-maleic anhydride adducts, ethylene glycol-bis-anhydrotrimellitate and 5-(2,5-dioxotetrahydrofuryl)-3-methyl-3-cyclohexene-1,2-dicarboxylic anhydride. Among them, methylnadic anhydride, methyltetrahydrophthalic anhydride or methylhexahydrophthalic anhydride is preferable, and methylhexahydrophthalic anhydride is more preferable from the viewpoint of the high heat resistance of the epoxy resin composition. These anhydrides can be used individually or in combination.

A solid acid anhydride can be used in the form of liquid at room temperature by mixing the solid acid anhydride with a liquid acid anhydride.

The amount (parts by weight) of the liquid acid anhydride (D) per 100 parts by weight of the liquid epoxy resin (B) is given by the formula: [amount (parts by weight) of liquid acid anhydride (D)]=(molecular weight of liquid acid anhydride (D)/number of acid anhydride groups per molecule of liquid acid anhydride (D))×(number of acid anhydride groups in liquid acid anhydride (D)/number of epoxy groups in liquid epoxy resin (B))×(100/epoxy equivalent of liquid epoxy resin (B)).

The amount of the liquid acid anhydride is not particularly limited as long as the ratio of the number of acid anhydride groups in the liquid acid anhydride (D) and the number of epoxy groups in the liquid epoxy resin (B) (number of liquid acid anhydride groups/number of liquid epoxy groups) falls within the following range.

In the present invention, the ratio of the number of acid anhydride groups in the liquid acid anhydride (D) and the number of epoxy groups in the liquid epoxy resin (B) (number of acid anhydride groups/number of epoxy groups) is adjusted to, for example, 1.5 or less, preferably 1.2 or less because when this ratio is excessively large, the mechanical characteristics of a cured product obtained from the epoxy resin composition for casting are deteriorated. In addition, the ratio of number of acid anhydride groups/number of epoxy groups is adjusted to, for example, 0.5 or more, preferably 0.7 or more because when this ratio is excessively small, the mechanical characteristics of a cured product obtained from the epoxy resin composition for casting are deteriorated. The ratio of number of acid anhydride groups/number of epoxy groups is most preferably 0.8 to 1.0.

<Curing Accelerator (E)>

Examples of the curing accelerator (E) of the present invention include tertiary amines such as triethylamine and benzyldimethylamine; imidazoles such as 2-methylimidazole and 2-ethyl-4-methylimidazole; organic phosphorus compounds such as triphenylphosphine, tri-p-tolylphosphine and triphenyl phosphite; quaternary phosphonium salts such as tetraphenylphosphonium tetraphenylborate, tetraphenylphosphonium tetra-p-tolylborate, tetraphenylphosphine bromide, tetra-n-butylphosphonium bromide and tetra-n-butylphosphonium o,o-diethylphosphorodithioate; diazabicycloalkenes such as 1,8-diazabicyclo[5.4.0]undecene-7 and organic acid salts thereof; organic metal compounds such as zinc octylate, tin octylate and aluminum acetylacetone complexes; quaternary ammonium salts such as tetraethylammonium bromide and tetrabutylammonium bromide; boron compounds such as boron trifluoride and triphenyl borate; and metal halogen compounds such as zinc chloride and stannic chloride. Latent curing accelerators represented by, for example, microcapsule-type latent accelerators in which the surface of a high-melting-point imidazole compound, dicyandiamide, or a phosphorus-based or phosphine-based accelerator is coated with a polymer; amine salt-type latent curing accelerators; and high-temperature-dissociative thermally cationically polymerizable latent curing accelerators such as Lewis acid salts and Broensted acid salts can be used. These curing accelerators (E) can be used individually or in mixture of two or more thereof.

Among these curing accelerators, imidazoles, quaternary phosphonium salts, diazabicycloalkenes, organic metal compounds and quaternary ammonium salts are preferable, imidazoles and quaternary phosphonium salts are more preferable, and 2-ethyl-4-methylimidazole and tetra-n-butylphosphonium o,o-diethylphosphorodithioate are even preferable, in the viewpoint of the colorless and the transparency of the curing accelerator, and the heat resistance of the cured product formed from the epoxy resin composition.

The amount of the curing accelerator (E) is preferably from 0.05 to 4 parts by weight, and more preferably from 0.1 to 2 parts by weight, per 100 parts by weight of the liquid acid anhydride (D), in the view of the balance between the curing rate and the heat generated in the curing step.

<Core Shell Polymer (F)>

The core shell polymer (F) of the present invention is used for improving the toughness, the fracture toughness and the thermal shock resistance of the cured product formed from the epoxy resin composition for casting. The core shell polymer (F) is particles covered with a shell layer containing a polymer on a core layer containing an elastic polymer.

The core shell polymer of the present invention is a polymer like particles containing at least two layer structure.

Preferably, the core shell polymer (F) is a polymer containing a core layer including a cross linked polymer and a shell layer including a polymer graft-polymerized on the core layer. At least one shell layer is graft-polymerized with a monomer for forming a graft layer on the surface of the core layer and covers the part or the whole part of the core layer.

The core layer is preferably a crosslinked polymer having the rubber property in order to improve the thermal shock resistance of the cured product formed from the epoxy resin composition. In order to exhibit the rubber property in the core layer, the core layer has a glass transition temperature of preferably 0° C. or less, more preferably −20° C. or less, and particularly preferably −40° C. or less. In the specification, the glass transition temperature is referred to as Tg in some case. Tg can be measured with dynamic viscoelastic measuring method or differential scanning calorimetry.

A polymer capable of forming the core layer having the rubber property includes a natural rubber, a rubber polymer comprising from 50 to 100% by weight of at least one monomer (first monomer) selected from a diene monomer (conjugated diene monomer) and (meth)acrylate monomer and from 0 to 50% by weight of other polymerizable vinyl monomer (second monomer), a siloxane rubber, or combination thereof. It is preferable that the core layer is the diene rubber polymerized with the diene monomer in the view of highly improving toughness of the cured product, and preventing the increase of the viscosity during swelling of the core layer due to lower affinity with a matrix resin. Among these, the core layer is preferably the (meth) acrylate rubber (acrylic rubber) because a various polymers can be designed from the combination of many monomers. In the case where the crack resistance and the impact resistance at lower temperature is improved without lowering the heat resistance in the cured product, it is preferable that the core layer is the siloxane rubber (polysiloxane polymer). In the present invention, (meth) acrylate means acrylate and/or methacrylate.

A monomer (conjugated diene monomer) for constituting the diene rubber used in the core layer includes 1,3-butadiene, isoprene, 2-chrolo-1,3-butadiene, 2-methyl-1,3-butadiene and the like. These may be used individually or in combination of two or more monomers.

From the view of highly improving toughness, and preventing the increase of the viscosity during the swelling of the core layer due to lower affinity with the matrix resin, a butadiene rubber polymerized with 1,3-butadiene, a butadiene-styrene rubber of a copolymer polymerized with 1,3-butadiene and styrene, or a butadiene-acrylate rubber of a copolymer polymerized with 1,3-butadiene and butylacrylate or 2-ethylhexylacrylate is preferable, and a butadiene rubber is more preferable. In addition, a butadiene-styrene rubber is more preferable in the view of improving the transparency of the cured product obtained from the adjustment of refractive index and improving the balance between the appearance and the impact resistance. In addition, butadiene-acrylate rubber is preferable, because the weather resistance and the heat resistance are improved by decreasing the content of butadiene having double bonds in the butadiene-acrylate rubber from the introduction of the acrylate.

A monomer for constituting the (meth)acrylate rubber used in the core layer includes alkyl (meth)acrylates having carbon atoms of from 1 to 22 such as methyl(meth)acrylate, ethyl(meth)acrylate, butyl(meth)acrylate, 2-ethylhexyl (meth)acrylate, octyl(meth)acrylate, dodecyl(meth)acrylate, stearyl(meth)acrylate, behenyl(meth)acrylate; aromatic ring containing (meth)acrylates having carbon atoms of from 6 to 20 such as phenoxy ethyl(meth) acrylate, benzyl(meth) acrylate; hydroxyalkyl(meth)acrylates having carbon atoms of from 1 to 20 such as 2-hydroxyethyl(meth)acrylate, 4-hydroxybutyl(meth)acrylate; glycidyl (meth) acrylates such as glycidyl (meth) acrylate and glycidyl alkyl (meth) acrylate; alkoxyalkyl(meth)acrylates; allylalkyl(meth)acrylates such as allyl(meth)acrylate, and allylalkyl(meth)acrylate; multifunctional (meth)acrylates such as monoethylene glycol di(meth)acrylate, triethylene glycol di(meth)acrylate, tetraethylene glycol di(meth)acrylate and the like. These (meth) acrylate monomers may be used individually or in combination of two or more (meth) acrylate monomers. The monomer is preferably alkyl (meth)acrylates having carbon atoms of from 1 to 20, allyl (meth)acrylates, more preferably ethyl (meth) acrylate, butyl (meth) acrylate, 2-ethylhexyl (meth) acrylate, and allyl (meth)acrylate.

A vinyl monomer (second monomer) polymerizable with the first monomer includes vinyl arenes such as styrene, α-methylstyrene, monochlorostyrene, dichlorostyrene; vinyl carboxylic acids such as acrylic acid, methacrylic acid; vinyl cyanides such as acrylonitrile, methacrylonitrile; halogenated vinyls such as chloro vinyl, bromo vinyl, chloroprene; vinyl acetate; alkenes such as ethylene, propylene, butylene, isobutylene; a multifunctional monomer such as diallylphthalate, triallylcyanurate, triallylisocyanurate, divinylbenzene. The vinyl monomer may be used individually or in combination of two or more vinyl monomers. The monomer is especially preferably styrene.

The siloxane rubber for constituting the core layer includes a polysiloxane polymer containing alkyl- or aryl-2-substituted silyloxy units such as dimethyl silyloxy, diethyl silyloxy, methylphenyl silyloxy, diphenyl silyloxy, dimethyl silyloxy-diphenyl silyloxy, or a polysiloxane polymer containing alkyl- or aryl-1-substituted silyloxy units such as a polysiloxane polymer having an organohydrogen silyloxy in which a part of alkyl in the side chain is substituted with hydrogen. The siloxane rubber may be used individually or in combination of two or more polymers. A combined rubber containing the siloxane rubber and (meth) acrylate rubber may be used. Among these, the siloxane rubber is preferably polysiloxane polymer having dimethyl silyloxy, methylphenyl silyloxy, or dimethylsilyloxy-butylacrylate in the view of giving the heat resistance to the cured product, and most preferably the polysiloxane polymer having dimethyl silyloxy, and dimethyl silyloxy-butylacrylate in the view of easy availability and the economy.

In the embodiment that the core layer is formed with the siloxane rubber, the siloxane rubber is contained in an amount of preferably not less than 10% by weight per 100% by weight of the core layer, so as not to impair the heat resistance of the cured product.

In the core layer, it is preferable that a crosslinked structure is introduced in the polymer polymerized with the above monomer(s) and the polysiloxane polymer in the view of retaining the dispersion stability of the core shell polymer (F) in the epoxy resin composition for casting. As methods for introducing the crosslinked structure, a conventional method can be used. A method for introducing the cross-linked structure to the polymer polymerized with the above monomer(s) includes a method for adding to a monomer for forming a polymer a crosslinking monomer such as a multifunctional monomer and a mercapto group-containing compound and the like, and polymerizing these. In addition, a method for introducing the crosslinked structure to the polysiloxane polymer includes a method for combining partly a multifunctional alkoxysilane compound at polymerization, a method for introducing a reactive group such as a vinyl reactive group, a mercapto group, a methacryloyl group and the like to the polysiloxane polymer, and adding a polymerizable vinyl monomer or organic peroxide to subjecting to radical reaction, and a method for adding a crosslinking monomer such as a multifunctional monomer and a mercapto group-containing compound to the polysiloxane polymer and polymerizing these.

The multifunctional monomer does not contain butadiene, and includes allylalkyl(meth)acrylate such as allyl(meth) acrylate, allylalkyl(meth)acrylate; allyloxyalkyl(meth)acrylate; multifunctional(meth)acrylate having two or more (meth)acrylic groups such as (poly)ethylene glycol di(meth) acrylate, butanediol di(meth)acrylate, ethylene glycol di(meth)acrylate, triethylene glycol di(meth)acrylate, tetraethylene glycol di(meth)acrylate; diallyl phthalate, triallylcyanurate, triallylisocyanurate, divinylbenzene and the like. Allylmethacrylate, triallyl isocyanurate, butanediol di(meth) acrylate and divinyl benzene are especially preferable.

In the present invention, the core layer may be composed of monolayer in some cases, and may be composed of multilayers. In the case where the core layer is composed of multilayer, the polymer composition of each layer may be different each other.

The amount of the core layer in the core-shell polymer is preferably from 80 to 95% by weight, and more preferably from 82 to 93% by weight, per 100% by weight of the whole core shell polymers in the view of the viscosity of the epoxy resin composition. In the case where the amount of the core layer is smaller, the viscosity of the epoxy resin composition is increased to deteriorate the handling. In the case where the amount of the core layer is much large, it is difficult to prepare the core shell polymer and to collect the core shell polymer from a solution after reaction in the practical form even if the core shell polymer can be synthesized. The amount of the core layer in the core shell polymer can be measured with absorbance ratio in spectrum from infrared spectroscopy.

In addition, the methyl ethyl ketone (MEK) insoluble content in the core shell polymer (F) is preferably 93% by weight or more, more preferably 95% by weight or more, even preferably 97% by weight or more, and even more preferably 98% by weight or more. In the case where the MEK insoluble content is less than 93% by weight, the viscosity of the epoxy resin composition tends to increase.

As a method for calculating MEK insoluble content in the core shell polymer (F), the powder or film of the core shell polymer is obtained by coagulating and dehydrating the aqueous latex containing the core shell polymer, and drying the core shell polymer. Then, 2 g of the powder of the core shell polymer is immersed in 100 g of methylethylketone (MEK) at 23° C. for 24 hours. Thus, obtained MEK insoluble content is collected to dry and weigh, and a weight ratio (%) to a weight of the core shell polymer used in the measurement is calculated as a MEK insoluble content.

The shell layer or the shell polymer existing at outermost of the core shell polymer (F) controls the compatibility between the core shell polymer (F) and the liquid epoxy resin (B) of the present invention. The shell layer contributes to effectively disperse the core shell polymer in the cured product formed from the epoxy resin composition for casting.

The shell polymer for forming the shell layer is preferably grafted on the core layer. More precisely, it is preferable that a monomer used in the formation of the shell layer is graft-polymerized on the core polymer for forming the core layer, and the shell polymer is chemically bonded to the core polymer.

It is preferable that the shell polymer is formed by graft-polymerizing the monomer for forming the shell layer under the presence of the core polymer, and a part or all of the core polymer is covered with the shell polymer. Such a polymerization can be carried out by adding a monomer for constituting the shell polymer to a latex containing the core polymer prepared in the state of an aqueous latex, and polymerizing the monomer and the core polymer.

The monomer for forming the shell layer is preferably an aromatic vinyl monomer, a vinyl cyanide monomer, an alkyl(meth) acrylate monomer, a glycidyl (meth)acrylate, an allyl (meth) acrylate, and the like in the view of the compatibility and the dispersibility of the core shell polymer in the epoxy resin composition for casting.

The monomer for forming the shell layer preferably contains a monomer having one or more reactive groups selected from the group consisting of an epoxy group, an oxetane group, a hydroxyl group, an amino group, an imide group, a carboxylic acid group, a carboxylic acid anhydride group, a cyclic ester, a cyclic amide group, a benzoxazine group, and a cyanate ester group in the view of the control of the dispersion state of the core shell polymer in the cured product. The monomer for forming the shell layer is more preferably a monomer having an epoxy group. The monomer having one or more reactive groups can control a variation of the dispersion state because the monomer joins in the reaction of the liquid epoxy resin (B) with the liquid acid anhydride (D) to form a chemical bond.

The monomer having an epoxy group is contained in an amount of preferably 10% by weight or less, and more preferably 5% by weight or less, per 100% by weight of the monomer for forming the shell layer. When the amount of the monomer having an epoxy group is more than 10% by weight in the monomers for forming the shell layer, the epoxy resin composition for casting has decreased storage stability. Therefore, it is preferable that the monomer having an epoxy group is not used in the case where the storage stability is highly improved.

In addition, when a multifunctional monomer having two or more double bonds is used as a monomer for forming the shell layer, the cross-linked structure is introduced in the shell layer. Thus, a multifunctional monomer having two or more double bonds is preferably used as a monomer for forming the shell layer because the swelling of the core shell polymer with the epoxy resin and the like is prevented in the epoxy resin composition for casting, or the viscosity of the epoxy resin composition for casting becomes lower to improve the handling. On the other hand, it is preferable that a multifunctional monomer having two or more double bonds is not used as a monomer for forming the shell layer in order to maximize effects for improving the toughness of the cured product.

Concrete example of the multifunctional monomer having two or more double bonds includes the same monomer as the multifunctional monomer, and is preferably allyl methacrylate, and triallylisocyanurate.

The multifunctional monomer is contained in an amount of preferably from 0.5 to 10% by weight, and more preferably from 1 to 5% by weight, per 100% by weight of a monomer for forming the shell layer.

Concrete example of the aromatic vinyl monomer includes styrene, α-methyl styrene, p-methyl styrene, divinyl benzene and the like.

Concrete example of the vinyl cyanide monomer includes acrylonitrile, and methacrylonitrile.

The concrete example of the alkyl (meth)acrylate monomer includes methyl(meth)acrylate, ethyl(meth)acrylate, butyl(meth)acrylate, hydroxyethyl(meth)acrylate, hydroxybutyl(meth)acrylate and the like.

Concrete example of the monomer having an epoxy group includes glycidyl (meth) acrylate, 4-hydroxy butyl(meth) acrylate glycidyl ether, allyl glycidyl ether, and the like. Particularly, glycidyl methacrylate is preferable in the view of the stability and the reactivity.

In the present invention, the shell layer is preferably a polymer polymerized with the monomer for forming the shell layer, for example, styrene of from 0 to 50% by weight (preferably from 1 to 50% by weight, more preferably from 5 to 50% by weight), methylmethacrylate of from 0 to 100% by weight (preferably from 50 to 99% by weight, more preferably from 70 to 95% by weight), and glycidyl methacrylate of from 0 to 10% by weight (preferably from 1 to 10% by weight, more preferably from 3 to 10% by weight). By this, a given toughness and mechanical property can be exhibited in the balanced manner. Particularly, in the case where methyl methacrylate is contained as a main component, thus obtained shell layer is preferable because the affinity with the cured product formed from the reaction of the liquid epoxy resin (B) and the liquid acid anhydride (D) is appropriately controlled.

These monomers may be used individually or in the combination of two or more monomers.

The shell layer may be formed with other monomer in addition to the above monomer components.

The amount of the shell layer in the core shell polymer (F) is preferably from 5 to 20% by weight, and more preferably from 7 to 18% by weight, per 100% by weight of the core shell polymer. In the case where the amount of the shell layer is too large or too small, the rubber content of the core shell polymer is out of the range of from 80 to 95% by weight, so that the handling of the epoxy resin composition is deteriorated.

An arithmetic number average particle diameter of the core shell polymer (F) of the present invention is preferably from 0.03 to 0.4 μm, more preferably from 0.05 to 0.3 μm, and even preferably from 0.05 to 0.2 μm in the view of the balance between the viscosity and the thermal shock resistance of the epoxy resin composition. When the arithmetic number average particle diameter of the core shell polymer (F) is small, the epoxy resin composition has high viscosity, and the casting of the composition becomes difficult. On the other hand, when the arithmetic number average particle diameter of the core shell polymer (F) is large, the cured product formed from the epoxy resin composition has decreased thermal shock resistance.

The amount of the core shell polymer (F) in the epoxy resin composition for casting is preferably from 0.3 to 10% by weight, more preferably from 1 to 6% by weight, and even preferably from 1.5 to 5% by weight, per 100% by weight of the sum of the silica powder (A), the liquid epoxy resin (B), the polyether polyol (C), the liquid acid anhydride (D), the curing accelerator (E), and the core shell polymer (F), in the view of the balance between the thermal shock resistance and the viscosity of the composition. In the case where the amount of the core shell polymer (F) is large, the viscosity of the composition is increased even if the thermal shock resistance of the cured product is improved.

<Method for Preparing Core Shell Polymer (F)>
(Method for Preparing Core Layer)

In the case where the polymer for forming the core layer as the constituent of the core shell polymer (F) used in the present invention comprises at least one monomer (first monomer) selected from the diene monomer (conjugated diene monomer) and (meth) acrylate monomer, the core layer can be prepared according to emulsion polymerization, suspension polymerization, micro-suspension polymerization and the like, and methods described in WO2005/028546 can be used.

In the case where the polymer for forming the core layer comprises the polysiloxane polymer, the core layer can be prepared by emulsion polymerization, suspension polymerization, micro-suspension polymerization and the like, and methods described in EP1338625 can be used.

(Method of Forming Shell Layer)

The shell layer can be formed by polymerizing a monomer for forming the shell layer with a known radical polymerization. In the case where a core shell polymer precursor constituting the core layer is obtained as an emulsion, it is preferable that the polymerization of the monomer for forming the shell layer is carried out with the emulsion polymerization, and the shell layer can be prepared according to methods of WO 2005/028546.

The following dispersants can be mentioned as examples of emulsifiers (dispersants) usable in the emulsion polymerization: various acids including alkyl or aryl sulfonic acids such as dioctylsulfosuccinic acid and dodecylbenzenesulfonic acid, alkyl or arylether sulfonic acids, alkyl or arylsulfuric acids such as dodecylsulfuric acids, alkyl or arylether sulfuric acids, alkyl or aryl-substituted phosphoric acids, alkyl or arylether-substituted phosphoric acids, N-alkyl or arylsarcosinic acids such as dodecylsarcosinic acid, alkyl or arylcarboxylic acids such as oleic acid and stearic acid, and alkyl or arylether carboxylic acids, and anionic emulsifiers (dispersants) such as alkali metal salts or ammonium salts of these acids; nonionic emulsifiers (dispersants) such as alkyl or aryl-substituted polyethylene glycols; and derivatives of polyvinyl alcohol, alkyl-substituted celluloses, polyvinyl pyrrolidone, and polyacrylic acid. Any of these emulsifiers (dispersants) may be used individually, or two or more of these may be used in combination.

The amount of the emulsifier (dispersant) is preferably as small as possible, but the dispersion stability of the core shell polymer in the aqueous latex should be secured. The emulsifier (dispersant) preferably has as high water solubility as possible. An emulsifier (dispersant) having high water solubility can be easily washed out with water, and thus its bad influence on the final cured product can be easily avoided.

As known initiators of emulsion-polymerization, thermal decomposition initiator such as 2,2'-azobisisobutylonitrile, organic peroxide, hydrogen peroxide, potassium persulphate, ammonium persulfate can be used. In the present invention, the organic peroxide is particularly preferable.

The organic peroxides includes t-butylperoxy isopropyl carbonate, p-menthane hydroperoxide, cumene hydroperoxide, dicumyl peroxide, t-butyl hydroperoxide, di-t-butyl peroxide, di-t-hexyl peroxide, and the like. Among these, the organic peroxides preferably have a 10 hr half-life temperature of 120° C. or more, and a 10 hr half-life temperature is referred to as $T_{10}$. The organic peroxides having a 10 hr half-life temperature of 120° C. or more is preferably di-t-butyl peroxide having $T_{10}$ of 124° C., p-menthane hydroperoxide having $T_{10}$ of 128° C., cumene hydroperoxide having $T_{10}$ of 158° C., and t-butyl hydroperoxide having $T_{10}$ of 167° C. in the view of high MEK insoluble content of the core shell polymer.

In addition, redox type initiators of peroxides such as organic peroxides in combination with reducing agents such as sodium formaldehyde sulfoxylate, glucose as needed and transition metal salts such as ferrous sulfate as needed, chelating agents such as disodium ethylenediaminetetraacetate as needed, further phosphorus-containing compounds such as sodium pyrophosphate as needed can also be used.

In the case of polymerization using a redox type initiator, it is possible to carry out the polymerization even at a low temperature at which the peroxide does not cause substantially thermal decomposition and to set the polymerization temperature in a wide range, and therefore such a polymerization is preferable.

The amount of the initiator or the amount of the reducing agent/transition metal salt/chelating agent when a redox-type initiator is used can be used in the range known in the art.

Also, a known chain transfer agent can be used. The chain transfer agent may be those used in the conventional emulsion polymerization, and is not particularly limited.

Concrete examples of the chain transfer agent include t-dodecyl mercaptan, n-octylmercaptan, n-tetradecylmercaptan, n-hexylmercaptan, and the like.

The conditions to be applied in the polymerization, such as polymerization temperature, pressure, and deoxidation, are those known in the art.

<Other Ingredients>

In the present invention, other ingredients can be used as necessary. Other ingredients include dehydrating agents such as calcium oxide, anti-tracking reducing agents/flame retardants such as aluminum hydroxide, heat-dissipating fillers such as aluminum oxide, silane coupling agents, antifoaming agents, antisettling agents, colorants such as pigments and dyes, extender pigments, ultraviolet absorbers, antioxidants, stabilizers (gelation preventing agents), plasticizers, leveling agents, antistatic agents, flame retardants, lubricants, viscosity reducing agents, shrinkage reducing agents, organic fillers, thermoplastic resins, desiccants and dispersants. The silane coupling agent is particularly preferable because it improves adhesiveness between silica and resin. Specific examples thereof include 3-glycidyloxypropyltrimethoxysilane, 3-glycidoxypropylmethyldimethoxysilane and 3-aminopropyltrimethoxysilane. The amount of the silane coupling agent is preferably from 0.1 to 2% by weight based on the amount of silica. Preferably, an antifoaming agent is added in blending because it is necessary to minimize bubbles in the epoxy resin composition for casting. The antifoaming agent may be appropriately selected from, for example, silicone-based antifoaming agents, fluorine-based antifoaming agents, acryl-based antifoaming agents, polyoxyethylene-based antifoaming agents and polyoxypropylene-based antifoaming agents. Specific examples thereof may include BYK-A500 and BYK-1790 from BYK Additives & Instruments. The amount of the antifoaming agent is preferably from 0.01 to 4 parts by weight based on 100 parts by weight of the liquid epoxy resin (B).

Preferably, an antisettling agent is added for improving the storage stability of the epoxy resin composition for casting. The antisettling agent is preferably an additive that improves the thixotropy of the epoxy resin composition, for example, fumed silica or finely powdered organic bentonite. The amount of the antisettling agent is preferably from 0.1 to 5 parts by weight based on 100 parts by weight of the liquid epoxy resin (B). Preferably, an inorganic flame retardant such as aluminum hydroxide is used as the flame retardant in an amount of from 10 to 200 parts by weight based on 100 parts by weight of the liquid epoxy resin (B).

<Method for Producing Epoxy Resin Composition for Casting>

The epoxy resin composition for casting according to the present invention is mainly composed of the silica powder (A), and contains as a binder for the silica powder (A), the curable resin composition including the liquid epoxy resin (B), the polyether polyol (C), the liquid acid anhydride (D), the curing accelerator (E), and the core shell polymer (F).

Preferably, a dispersion in which the core shell polymer (F) is temporarily dispersed in the liquid epoxy resin (B) in a state of primary particles is used because the viscosity of the epoxy resin composition for casting is easily controlled.

As the method for obtaining the dispersion with the core shell polymer (F) dispersed in the liquid epoxy resin (B) in a state of primary particles, various methods can be used, and examples thereof include a method in which the core shell polymer (F) obtained in a state of aqueous latex is brought into contact with the liquid epoxy resin (B), and unnecessary components such as water are then removed; and a method in which the core shell polymer (F) is temporarily extracted in an organic solvent, the extract is then mixed with the liquid epoxy resin (B), and the organic solvent is removed. Preferably, the method described in WO 2005/028546 is used. The specific method for producing the dispersion is preferably a method including, in order, a first step of mixing an aqueous latex (specifically, a reaction mixture after production of a core shell polymer by emulsification polymerization), which contains the core shell polymer (F), with an organic solvent having a solubility of not less than 5% and not more than 40% in water at 20° C., and then mixing the mixture with an excessive amount of water to aggregate the core shell polymer; a second step of separating and collecting the aggregated core shell polymer (F) from the liquid phase, and then mixing the core shell polymer (F) with the organic solvent again to obtain an organic solvent solution of the core shell polymer (F); and a third step of mixing the organic solvent solution with the liquid epoxy resin (B), and then distilling off the organic solvent.

The liquid epoxy resin (B) is preferably liquid at 23° C. in the view of easily carrying out the third step. The term "liquid at 23° C." means that the softening point is 23° C. or lower, i.e. fluidity of the liquid epoxy resin (B) is exhibited at 23° C.

To the composition in which particles of the core shell polymer (F) are dispersed in the liquid epoxy resin (B) as primary particles (hereinafter, also referred to as a "primary particle dispersion composition"), which is obtained by passing through the above-mentioned steps, the liquid epoxy resin (B) is added to appropriately dilute the primary particle dispersion composition if necessary, the silica powder (A), the liquid acid anhydride (D) and the curing accelerator (E) are additionally mixed, and if necessary, the above-mentioned other ingredients are mixed to obtain the epoxy resin composition for casting according to the present invention in which particles of the core shell polymer (F) are dispersed as primary particles (preferably primarily dispersed).

On the other hand, the powdered core shell polymer (F) obtained by performing solidification by a method such as salting-out, and then drying can be redispersed in the liquid epoxy resin (B) using a disperser having a high mechanical shearing force, such as three paint rolls, a roll mill or a kneader. Here, by giving a mechanical shearing force to a mixture of the liquid epoxy resin (B) and the core shell polymer (F) at a high temperature, the core shell polymer (F) can be efficiently dispersed in the liquid epoxy resin (B). The temperature used in the preparation of the dispersion is preferably 50 to 200° C., more preferably 70 to 170° C., even preferably 80 to 150° C., and particularly preferably 90 to 120° C. When the temperature is lower than 50° C., the core shell polymer (F) may not be sufficiently dispersed, and when the temperature is higher than 200° C., the liquid epoxy resin (B) and the core shell polymer (F) may be thermally degraded.

The epoxy resin composition for casting according to the present invention may be prepared by mixing the silica powder (A), the liquid epoxy resin (B), the liquid acid anhydride (D), the curing accelerator (E) and the core shell polymer (F) as two liquids: a main component and a curing component. For example, the epoxy resin composition for casting according to the present invention may be prepared by mixing a main component and a curing component where the main component is a mixed component of the silica powder (A), the liquid epoxy resin (B) and the core shell polymer (F) and the curing component is a mixed component of the liquid acid anhydride (D), the curing accelerator (E), and optionally the silica powder (A).

<Cured Product>

The present invention includes a cured product obtained by curing the epoxy resin composition for casting. By using a specific polyether polyol and core shell polymer in combination, a cured product is excellent in heat resistance and thermal shock resistance.

The impact strength of the cured product according to the present invention is, for example, more than 11 kJ/m$^2$, preferably not less than 12 kJ/m$^2$ and not more than 50 kJ/m$^2$. The impact strength can be measured in accordance with JIS K7111-1.

The flexural strength of the cured product according to the present invention is preferably not less than 80 MPa and not more than 200 MPa. The flexural strength can be measured in accordance with JIS K7171.

The glass transition temperature of the cured product according to the present invention is, for example, 100° C. or higher, preferably 105° C. or higher, and more preferably not lower than 110° C. and not higher than 160° C.

The glass transition temperature can be determined using a previously known differential scanning calorimeter.

The thermal shock resistance index of the cured product according to the present invention is, for example, more than 20, preferably 22 or more, more preferably 23 or more, still more preferably 25 or more, still more preferably not less than 30 and not more than 50. The thermal shock resistance index is determined in the following manner: the cured product is subjected to 50 cycles with one cycle including holding the cured product at 150° C. and then at −40° C., and the average of the numbers of cracks in the cured product is defined as the thermal shock resistance index. The average of the numbers of cycles in which cracks are generated may also be defined as the thermal shock resistance index (when cracks are not generated in 50 cycles, the thermal shock resistance is >50). By using a given polyether polyol and core shell polymer in combination, the thermal shock resistance is markedly improved.

<Uses>

The composition according to the present invention is excellent in heat resistance and thermal shock resistance, and therefore suitable for insulation of electronic devices etc. Specific examples of suitable articles using the composition according to the present invention include coils, capacitors or resistors in which a necessary part is sealed or protected with the cured product formed from the epoxy resin composition for casting; and electric or electronic equipment including the coils, capacitors or resistors. In addition, the epoxy resin composition according to the present invention may be suitably used in solid insulated switching devices containing an electric insulating part which is the cured product formed from the epoxy resin composition for casting.

The present application claims the benefit of priority to Japanese Patent Application Number 2014-185608 filed on Sep. 11, 2014. The entire contents of the specification of Japanese Patent Application Number 2014-185608 filed on Sep. 11, 2014 are hereby incorporated by reference.

EXAMPLES

Hereinafter, the present invention will be described in detail with reference to Examples and Comparative Examples, but the present invention is not limited thereto, and the variation and the modification of the present invention without departing from the gist described above and below are all included the technical scope of the present invention. In the following examples, "part(s)" and "%" mean "part(s) by weight" and "% by weight", respectively.

The measurement and test employed in the following Production Examples, Examples, and Comparative Examples are carried out as follows.

[1] Measurement of Average Particle Diameter of Core Shell Polymer

An arithmetic number average particle diameters (Mn) of the core shell polymer particles dispersed in the aqueous latex were measured using a particle size analyzer (MICROTRAC (registered trademark) UPA 150, manufactured by Nikkiso Co., Ltd.). A measuring sample was used after diluting with deionized water.

[2] Measurement of Weight Average Particle Diameter (Median Diameter D50) of Silica Powder A weight average particle diameter (median diameter D50) of the silica powder was measured using a Microtrac MT 3000 EX (manufactured by Nikkiso Co., Ltd.). A measuring sample was prepared by adding 0.5 g of silica powder to a 1% sodium dodecyl benzene sulfonate solution with stirring. The measurement was carried out by inputting the refractive indexes of water and silica powder, and adjusting the sample concentration in a range of a signal level of green color for a measurement time of 20 seconds.

[3] Measurement of MEK Insoluble Content of Core Shell Polymer 2 g of the powder of the core shell polymer obtained by drying a latex is immersed in 100 g of methylethylketone (MEK) at 23° C. for 24 hours, separated in MEK soluble content and MEK insoluble content, and collected MEK insoluble content. Thus, the MEK insoluble content is dried and weighed to calculate a weight ratio of MEK insoluble content to the weight of the core shell polymer.

[4] Evaluation of Thermal Shock Resistance of Cured Product

The epoxy resin composition was cast into a mold set so as to embed an iron hexagon nut (M8) at the center, and was heated and cured (curing conditions are described in the text of examples). Three of the thus-obtained cured products each having a diameter of 30 mm and a height of 9 mm were subjected to 50 cycles of heat cycle test with one cycle including holding the cured product at 150° C. for 1 hour and then at −40° C. for 1 hour. The number of cycles in which cracks were generated in the cured product was recorded, and the average for the three cured products was defined as a thermal shock resistance index. A larger value shows higher thermal shock resistance. When cracks were not generated in 50 cycles, the thermal shock resistance index was expressed as >50. For example, when of the three cured products, two cured products had a thermal shock resistance index of >50, and one cured product had a thermal shock resistance index of 40, the thermal shock resistance indices of these cured products were set as 50, 50 and 40, respectively, and the average thereof was calculated.

[5] Measurement of Glass Transition Temperature (Tg) of Cured Product

Cured products were prepared in the same manner as in [4] Evaluation of Thermal Shock Resistance of Cured Product. However, the iron hexagon nut was not used. The obtained cured product was cut by a diamond-cutter. The cured product having a weight of 20 mg was measured under a nitrogen flow using a differential scanning calorimeter DSC 220C manufactured by Seiko Instruments Inc. As the measurement method, the temperature was elevated from 50° C. to 220° C. at a temperature elevation rate of 20° C. per minute, and then immediately lowered to 50° C. at a rate of 40° C. per minute to eliminate a thermal history. Thereafter, the temperature was elevated from 50° C. to 220° C.

at a temperature elevation rate of 20° C. per minute to measure the glass transition temperature.

[6] Evaluation of Impact Strength of Cured Product

The impact strength was evaluated by a charpy test. The impact strength was evaluated by an unnotched charpy flat-wise impact test at 23° C. in accordance with JIS K7111-1. The specimen used has a size of 50 mm (length)×6 mm (width)×5 mm (thickness).

[7] Evaluation of Flexural Strength of Cured Product

The flexural strength of the section of the cured product was measured by a flexural test at 23° C. in accordance with JIS K7171. The specimen used has a size of 100 mm (length)×10 mm (width)×5 mm (thickness).

A silica powder (A), a liquid epoxy resin (B), a polyether polyol (C), a liquid acid anhydride (D), a curing accelerator (E) and a core shell polymer (F) used in Examples and Comparative Examples are shown. The core shell polymer (F) was dispersed in the epoxy resin (B) to form a dispersion (G).

<Silica Powder (A)>
A-1: CRYSTALITE CMC-12S (manufactured by TATSUMORI LTD., median diameter D50: 6 μm)
A-2: MILLISIL M10 (manufactured by SIBELCO N.V., median diameter D50: 23 μm)

<Liquid Epoxy Resin (B)>
B-1: bisphenol A diglycidyl ether (jER 828EL manufactured by Mitsubishi Chemical Corporation, epoxy equivalent: 184 to 194)
B-2: bisphenol F diglycidyl ether (Epikote 862 manufactured by Momentive Company, epoxy equivalent: 165 to 173)

<Polyether Polyol (C)>
C1-1: polypropylene glycol having an average molecular weight of 1000 (diol type, ACTCOL D-1000 manufactured by Mitsui Chemicals, Inc.)
C1-2: polypropylene glycol having an average molecular weight of 2000 (diol type, ACTCOL D-2000 manufactured by Mitsui Chemicals, Inc.)
C1-3: polytetramethylene glycol having an average molecular weight of 1000 (diol type, PTMG 1000 manufactured by Mitsubishi Chemical Corporation)
C1-4: polyoxypropylene glyceryl ether having an average molecular weight of 1000 (triol type, ACTCOL T-1000 manufactured by Mitsui Chemicals, Inc.)
C2-1: polypropylene glycol having an average molecular weight of 3000 (diol type, ACTCOL D-3000 manufactured by Mitsui Chemicals, Inc.)
C2-2: polypropylene glycol having an average molecular weight of 4000 (diol type, ACTCOL D-4000 manufactured by Mitsui Chemicals, Inc.)
C2-3: polyoxypropylene glyceryl ether having an average molecular weight of 3000 (triol type, ACTCOL T-3000 manufactured by Mitsui Chemicals, Inc.)

<Liquid Acid Anhydride (D)>
D-1: methyltetrahydrophthalic anhydride (HN 2200, MTHPA manufactured by Hitachi Chemical Company, Ltd.)
D-2: mixture of methylhexahydrophthalic anhydride and hexahydrophthalic anhydride at a ratio of 7:3 (RIKACID MH-700 manufactured by New Japan Chemical Co., Ltd.)

<Curing Accelerator (E)>
E-1: 2-ethyl-4-methylimidazole (CUREZOL 2E4MZ manufactured by SHIKOKU CHEMICALS CORPORATION.)
E-2: tetra-n-butylphosphonium o,o-diethylphosphorodithionate (HISHICOLIN PX-4ET manufactured by NIPPON CHEMICAL INDUSTRIAL CO., LTD.)

<Core Shell Polymer (F)>
F-1 to F-5: F-1 to F-3 each represent a core shell polymer having a butadiene rubber core as a main component of the core, F-4 represents a core shell polymer having polysiloxane rubber as a main component of the core, F-5 represents a core shell polymer having acrylic rubber as a main component of the core. Details thereof are as described in production examples below.
F-6: commercial product (PARALOID EXL-2655 manufactured by The Dow Chemical Company). The rubber amount estimated by infrared spectroscopy was about 70% in terms of butadiene rubber, and the MEK insoluble content was 95%.

Production examples for core shell polymers (F-1 to F-5), and production examples for dispersions (G-1 to G-5) with core shell polymers (F-1 to F-5) dispersed in the liquid epoxy resin (B-1) or (B-2) are shown below.

(Production Example of Core Shell Polymer)
1. Formation of Core Layer

Production Example 1-1

Preparation of Polybutadiene Rubber Latex (R-1)

A pressure resistant polymerization reactor was charged with 200 parts of deionized water, 0.03 parts of tripotassium phosphate, 0.25 parts of potassium dihydrogen phosphate, 0.002 parts of disodium ethylenediaminetetraacetate (EDTA), 0.001 parts of ferrous sulfate heptahydrate (Fe), and 0.2 parts of sodium dodecylbenzenesulfonate (SDS), and the mixture was stirred while sufficiently purging with nitrogen to remove oxygen. Thereafter, 100 parts of butadiene (BD) was introduced into the system, and the temperature was raised to 45° C. To the polymerization reactor were added 0.015 parts of p-menthane hydroperoxide (PHP) and then 0.04 parts of sodium formaldehyde sulfoxylate (SFS), thereby initiating polymerization. At four hours after the polymerization initiation, 0.3 parts of SDS, 0.01 parts of PHP, 0.0015 parts of EDTA, and 0.001 parts of Fe were introduced thereto. After seven hours of polymerization, 0.4 parts of SDS was added. After ten hours of polymerization, residual monomers were removed by devolatilization under reduced pressure to terminate the polymerization. Thus, a latex (R-1) that contains polybutadiene rubber particles was obtained. The polymerized rate was 99% or more. The polybutadiene rubber particles contained in the obtained latex had an arithmetic number average particle diameter of 0.14 μm.

Production Example 1-2

Preparation of Polydimethyl Siloxane Rubber Latex (R-2)

A mixture of 251 parts of deionized water, 0.5 part of SDS, 100 parts of octamethyl cyclotetrasiloxane, 2 parts of tetraethoxy siloxane, and 2 parts of γ-acryloyloxypropyl dimethoxymethylsilane was stirred with a homomixer at 10000 rpm for 5 minutes to prepare emulsion. The emulsion was charged in a lump into a glass reactor having five necks equipped with a stirrer, a reflux condenser, a nitrogen inlet, an apparatus for adding auxiliary raw materials including monomers and an emulsifying agent and a thermometer. With stirring a mixture, 1 part (solid content) of 10% dodecyl benzene sulfonate was added thereto, the temperature was increased at 80° C. over about 40 minutes, and the reaction was carried out at 80° C. for 6 hours. After the system was cooled to 25° C. and then left for 20 hours, and the pH value of the mixture was adjusted to 6.8 with sodium hydroxide, and the polymerization was terminated, thereby producing a latex (R-3) which contained polysiloxane rubber particles (R-2). The polymerized rate was 87%. The polysiloxane rubber particles contained in the latex had an arithmetic number average particle diameter of 0.13 μm.

Production Example 1-3

Preparation of Acrylic Rubber Latex (R-3)

Into a glass reactor having five necks equipped with a reflux condenser, a nitrogen inlet, an apparatus for adding monomers and an emulsifying agent, and a thermometer were charged 225 parts of deionized water, 0.002 parts of EDTA, 0.001 parts of Fe, 0.05 parts of SFS and 0.6 parts of SDS. Subsequently, the system was heated to 60° C. while stirring in a nitrogen gas stream.

Subsequently, a mixture of 3 parts of 2-ethylhexyl acrylate (2-EHA), 6.6 parts of n-butyl acrylate (BA), 0.4 parts of allyl methacrylate (ALMA) and 0.002 parts of cumene hydroperoxide (CHP) was added to the system to stir for 1 hour.

Further, a mixture containing 27 parts of 2-EHA, 59.4 parts of BA, 3.6 parts of ALMA, and 0.02 parts of CHP was added dropwise continuously over 4 hours. After two and four hours of polymerization, 0.2 parts of SDS was added respectively. The stirring of the system was continued for 1 hour after the completion of the addition of the monomer mixture to complete the polymerization, thereby producing a latex (R-3) which contained acrylic rubber particles. The polymerized rate was 99% or more. The acrylic rubber particles contained in the latex had an arithmetic number average particle diameter of 0.07 μm.

2. Preparation of Core Shell Polymer (F) (Formation of Shell Layer)

Production Example 2-1

Preparation of Latex (F-1LX) Containing Core Shell Polymer (F-1)

Into a glass reactor having five necks equipped with a reflux condenser, a nitrogen inlet, an apparatus for adding monomers and an emulsifying agent, and a thermometer were charged with 1575 parts (corresponding to 518 parts of polybutadiene rubber particles) of the latex (R-1) obtained in Production Example 1-1 and 315 parts of deionized water, and the mixture was stirred at 60° C. while purging with nitrogen. After 0.024 parts of EDTA, 0.006 parts of Fe, and 1.2 parts of SFS were added, a mixture of graft monomers (3 parts of styrene (ST), 35 parts of methyl methacrylate (MMA)) and 0.1 parts of cumene hydroperoxide (CHP) was continuously added thereto over a period of 2 hours to carry out graft polymerization. After completion of the addition, the mixture was stirred for further 2 hours to finish the reaction, thereby obtaining a latex (F-1LX) of a core shell polymer (F-1). The polymerized rate was 99% or more. The core content of the core shell polymer (F-1) was 93% from the charge amount and the reacted rate. An arithmetic number average particle diameter of the core shell polymer (F-1) contained in the obtained latex was 0.14 μm and MEK insoluble content was 98%.

Production Example 2-2

Preparation of Latex (F-2LX) of Core Shell Polymer (F-2)

The latex (F-2LX) of the core shell polymer (F-2) was prepared in the same manner as Production Example 2-1 except that ST 5 parts, glycidyl methacrylate (GMA) 5 parts, MMA 80 parts, CHP 0.3 parts were used in place of ST 3 parts, MMA 35 parts, CHP 0.1 parts as graft monomers. The polymerized rate was 99% or more. The core content of the core shell polymer (F-2) was 85% from the charge amount and the reacted rate. An arithmetic number average particle diameter of the core shell polymer (F-2) contained in the obtained latex was 0.15 μm and MEK insoluble content was 98%.

Production Example 2-3

Preparation of Latex (F-3LX) of Core Shell Polymer (F-3)

The latex (F-3LX) of the core shell polymer (F-3) was prepared in the same manner as Production Example 2-2 except that 2,2'-azobisisobutylonitrile (AIBN) 0.6 parts were used in place of CHP 0.3 parts, and AIBN was added to the system before the addition of the graft monomer. The polymerized rate was 99% or more. The core content of the core shell polymer (F-3) was 85% from the charge amount and the reacted rate. An arithmetic number average particle diameter of the core shell polymer (F-3) contained in the obtained latex was 0.15 μm and MEK insoluble content was 93%.

Production Example 2-4

Preparation of Latex (F-4LX) of Core Shell Polymer (F-4)

Into a glass reactor having five necks equipped with a reflux condenser, a nitrogen inlet, an apparatus for adding monomers and an emulsifying agent, and a thermometer were charged with 2060 parts (corresponding to 510 parts of polydimethylsiloxane rubber particles) of the latex (R-2) obtained in Production Example 1-2, and the mixture was stirred at 60° C. while purging with nitrogen. After 0.024 parts of EDTA, 0.006 parts of Fe, and 1.2 parts of SFS were added, a mixture of graft monomers (7 parts of ST, 83 parts of MMA) and 0.3 parts of CHP was continuously added thereto over a period of 2 hours to carry out graft polymerization. After completion of the addition, the mixture was stirred for further 2 hours to finish the reaction, thereby obtaining a latex (F-4LX) of a core shell polymer (F-4). The polymerized rate was 99% or more. The core content of the core shell polymer (F-4) was 85% from the charge amount and the reacted rate. An arithmetic number average particle diameter of the core shell polymer (F-4) contained in the obtained latex was 0.14 μm and MEK insoluble content was 96%.

Production Example 2-5

Preparation of Latex (F-5LX) of Core Shell Polymer (F-5)

Into a glass reactor having five necks equipped with a reflux condenser, a nitrogen inlet, an apparatus for adding monomers and an emulsifying agent, and a thermometer were charged with 1680 parts (corresponding to 510 parts of acrylic rubber particles) of the latex (R-3) obtained in Production Example 1-3 and 0.1 parts of SDS, and the mixture was stirred at 60° C. while purging with nitrogen. After 0.024 parts of EDTA, 0.006 parts of Fe, and 1.2 parts of SFS were added, a mixture of graft monomers (6 parts of ST, 83 parts of MMA, and 1 part of ALMA) and 0.3 parts of t-butylhydroperoxide (t-BHP) was continuously added thereto over a period of 2 hours to carry out graft polymerization. After completion of the addition, the mixture was stirred for further 2 hours to finish the reaction, thereby obtaining a latex (F-5LX) of a core shell polymer (F-5). The polymerized rate was 99% or more. The core content of the core shell polymer (F-5) was 85% from the charge amount and the reacted rate. An arithmetic number average particle diameter of the core shell polymer (F-5) contained in the obtained latex was 0.07 μm and MEK insoluble content was 99%.

3. Preparation of Dispersion (G-1 to G-5) of Core Shell Polymer (F) Dispersed in Liquid Epoxy Resin (B-1) or (B-2)

Production Example 3-1

Preparation of Dispersion (G-1) Based on Liquid Epoxy Resin (B-1)

100 parts of methyl ethyl ketone (MEK) was introduced into a 1 L mixing tank at 25° C., and the aqueous latex (F-1LX) (corresponding to 30 parts of core shell polymer) of the core shell polymer obtained in Production Example 2-1 was charged with stirring. After uniformly mixing, 150 parts of water was charged at a feed rate of 60 parts/minute. After completion of the supply, stirring was stopped immediately to obtain floatable aggregates and a slurry liquid containing aqueous phase containing a portion of organic solvent. Then, the aqueous phase was discharged from the discharging port of the tank bottom. 70 parts of MEK was added to the resulting agglomerates, and uniformly mixed to obtain a dispersion in which a core shell polymer was uniformly dispersed. This dispersion was mixed with 70 parts of a liquid epoxy resin (B-1). MEK was removed from this mixture with a rotary evaporator. Thus, dispersion (G-1) in which core shell polymers (F-1) were dispersed in an amount of 30% by weight in the liquid epoxy resin was obtained.

Production Example 3-2

Preparation of Dispersion (G-2) Based on Liquid Epoxy Resin (B-1)

Dispersion (G-2) in which core shell polymers (F-2) were dispersed in an amount of 30% by weight in the liquid epoxy resin (B-1) was obtained in the same manner as Production Example 3-1 except that the aqueous latex (F-2LX) of the core shell polymer was used in place of the aqueous latex (F-1LX) of the core shell polymer used in the production example 3-1.

Production Example 3-3

Preparation of Dispersion (G-3) Based on Liquid Epoxy Resin (B-1)

Dispersion (G-3) in which core shell polymers (F-3) were dispersed in an amount of 30% by weight in the liquid epoxy resin (B-1) was obtained in the same manner as Production Example 3-1 except that the aqueous latex (F-3LX) of the core shell polymer was used in place of the aqueous latex (F-1LX) of the core shell polymer used in the production example 3-1.

Production Example 3-4

Preparation of Dispersion (G-4) Based on Liquid Epoxy Resin (B-2)

Dispersion (G-4) in which core shell polymers (F-4) were dispersed in an amount of 30% by weight in the liquid epoxy resin (B-2) was obtained in the same manner as Production Example 3-1 except that the aqueous latex (F-4LX) of the core shell polymer was used in place of the aqueous latex (F-1LX) of the core shell polymer used in the production example 3-1, and a liquid epoxy resin (B-2) was used in place of the liquid epoxy resin (B-1).

Production Example 3-5

Preparation of Dispersion (G-5) Based on Liquid Epoxy Resin (B-2)

Dispersion (G-5) in which core shell polymers (F-5) were dispersed in an amount of 30% by weight in the liquid epoxy resin (B-2) was obtained in the same manner as Production Example 3-1 except that the aqueous latex (F-5LX) of the core shell polymer was used in place of the aqueous latex (F-1LX) of the core shell polymer used in the production example 3-1, and a liquid epoxy resin (B-2) was used in place of the liquid epoxy resin (B-1).

The properties of core shell polymer used in Examples and Comparative Examples are shown in Table 1.

TABLE 1

| Note | F-1 Production Example 2-1 | F-2 Production Example 2-2 | F-3 Production Example 2-3 | F-4 Production Example 2-4 | F-5 Production Example 2-5 | F-6 Paraloid EXL2655 |
|---|---|---|---|---|---|---|
| Number Average Particle Diameter (μm) | 0.14 | 0.15 | 0.15 | 0.14 | 0.07 | 0.1 to 0.3 |
| Core content (weight %) | 93 | 85 | 85 | 85 | 85 | 70 |
| MEK insoluble content (weight %) | 98 | 98 | 93 | 96 | 99 | 95 |

Examples 1 to 5

Comparative Examples 1 to 3

Each of the components was weighed according to a formulation shown in Table 2, and these components were homogeneously mixed by using stirring equipment (planetary centrifugal mixer, Awatori Rentaro, manufactured by Thinky). The mixture was defoamd under reduced pressure to obtain an epoxy resin composition for casting. The obtained composition was cured at 90° C. for three hours, and at 130° C. for three hours to prepare a cured product. The thermal shock resistance, a glass transition temperature, the impact strength, and the flexural strength were evaluated by using the cured product obtained. Results are shown in Table 2.

From the results of Table 2, a cured product obtained from the epoxy resin composition for casting of the present invention had well balanced property as well as high thermal shock resistance.

Examples 6 to 11

Comparative Example 4

Each of the components was weighed according to a formulation shown in Table 3, and these components were homogeneously mixed by using stirring equipment (planetary centrifugal mixer, Awatori Rentaro, manufactured by Thinky). The mixture was defoamed under reduced pressure to obtain an epoxy resin composition for casting. The obtained composition was cured at 90° C. for three hours, and at 130° C. for three hours to prepare a cured product. The thermal shock resistance and a glass transition temperature were evaluated by using the cured product obtained. Results are shown in Table 3.

TABLE 2

| Component | | Product name or Feature | Example 1 | Example 2 | Example 3 | Example 4 | Example 5 |
|---|---|---|---|---|---|---|---|
| Silica powder (A) | A-1 | CRYSTALITE CMC-12S | 50 | 50 | 50 | 50 | 50 |
| Liquid epoxy resin (B) | B-1 | jER828EL | 14 | 14 | 14 | 14 | 14 |
| Polyether polyol (C) | C1-2 | ACTCOL D-2000 | 1 | 2.5 | 5 | 4 | |
| | C2-1 | ACTCOL D-3000 | 4 | 2.5 | | 1 | 5 |
| Liquid acid anhydride (D) | D-1 | MTHPA | 17.8 | 17.8 | 17.8 | 17.8 | 17.8 |
| Curing accelerator (E) | E-1 | CUREZOL 2E4MZ | 0.2 | 0.2 | 0.2 | 0.2 | 0.2 |
| Core shell polymer (F) | G-1 | F-1 Core content 93% by weight | 13 | 13 | 13 | 13 | 13 |
| *Dispersion (G-1) | | MEK insoluble content 98% by weight | | | | | |
| (F-1) content of 30% by weight | | | | | | | |
| (B-1) content of 70% by weight | | | | | | | |
| Total formulated parts (parts) | | | 100 | 100 | 100 | 100 | 100 |
| Parts of polyether polyol (C) per 100 parts of liquid epoxy resin (B) | | | 22 | 22 | 22 | 22 | 22 |
| Ratio of polyether polyol (C1)/polyether polyol (C2) | | | 20/80 | 50/50 | 100/0 | 80/20 | 0/100 |
| Ratio of liquid epoxy resin (B)/liquid acid anhydride (D) | | | 100/11 | 100/77 | 100/77 | 100/77 | 100/77 |
| Rate (%) of core shell polymer (F) per total amount | | | 4 | 4 | 4 | 4 | 4 |
| Thermal shock resistance index | | | >50 | >50 | 23 | 23 | 27 |
| Glass transition temperature (° C.) | | | 137 | 133 | 125 | 127 | 139 |
| Impact strength (kJ/m$^2$) | | | 12 | 12 | 14 | 14 | 12 |
| Flexural strength (Pa: 800 MPa or more) | | | Pass | Pass | Pass | Pass | Pass |

| Component | | Product name or Feature | Comparative Example 1 | Comparative Example 2 | Comparative Example 3 |
|---|---|---|---|---|---|
| Silica powder (A) | A-1 | CRYSTALITE CMC-12S | 50 | 50 | 50 |
| Liquid epoxy resin (B) | B-1 | jER828EL | 23 | 23 | 14 |
| Polyether polyol (C) | C1-2 | ACTCOLD-2000 | | 1 | |
| | C2-1 | ACTCOLD-3000 | | 4 | |
| Liquid acid anhydride (D) | D-1 | MTHPA | 17.8 | 17.8 | 17.8 |
| Curing accelerator (E) | E-1 | CUREZOL 2E4MZ | 0.2 | 0.2 | 0.2 |
| Core shell polymer (F) | G-1 | F-1 Core content 93% by weight | | | 13 |
| *Dispersion (G-1) | | MEK insoluble content 98% by weight | | | |
| (F-1) content of 30% by weight | | | | | |
| (B-1) content of 70% by weight | | | | | |
| Total formulated parts (parts) | | | 91 | 96 | 95 |
| Parts of polyether polyol (C) per 100 parts of liquid epoxy resin (B) | | | 0 | 22 | 0 |
| Ratio of polyether polyol (C1)/polyether polyol (C2) | | | | 20/80 | |
| Ratio of liquid epoxy resin (B)/liquid acid anhydride (D) | | | 100/77 | 100/77 | 100/77 |
| Rate (%) of core shell polymer (F) per total amount | | | 0 | 0 | 4 |
| Thermal shock resistance index | | | 10 | 10 | 10 |
| Glass transition temperature (° C.) | | | 145 | 137 | 145 |
| Impact strength (kJ/m$^2$) | | | 7 | 10 | 11 |
| Flexural strength (Pa: 800 MPa or more) | | | Pass | Pass | Pass |

TABLE 3

| Component | | Product name or Feature | Example 6 | Example 7 | Example 8 | Example 9 | Example 10 |
|---|---|---|---|---|---|---|---|
| Silica powder (A) | A-1 | CRYSTALITE CMC-12S | 50 | 50 | 50 | 50 | 50 |
| Liquid epoxy resin (B) | B-1 | jER828EL | 14 | 14 | 14 | 14 | 14 |
| Polyether polyol (C) | C1-1 | ACTCOL D-1000 | 1 | 1 | | | |
| | C1-2 | ACTCOL D-2000 | | | | | 1 |
| | C1-3 | PTMG1000 | | | 1 | | |
| | C1-4 | ACTCOL T-1000 | | | | 1 | |
| | C2-1 | ACTCOL D-3000 | 4 | | | 4 | 4 |
| | C2-2 | ACTCOL D-4000 | | 4 | | | |
| | C2-3 | ACTCOL T-3000 | | | | | |
| Liquid acid anhydride (D) | D-1 | MTHPA | 17.8 | 17.8 | 17.8 | 17.8 | 17.8 |
| Curing accelerator (E) | E-1 | CUREZOL 2E4MZ | 0.2 | 0.2 | 0.2 | 0.2 | 0.2 |
| Core shell polymer (F) | G-1 | F-1 Core content 93% by weight | 13 | 13 | 13 | 13 | 13 |
| *Dispersion (G-1) | | MEK insoluble content 98% by weight | | | | | |
| (F-1) content of 30% by weight | | | | | | | |
| (B-1) content of 70% by weight | | | | | | | |
| Total formulated parts (parts) | | | 100 | 100 | 100 | 100 | 100 |
| Parts of polyether polyol (C) per 100 parts of liquid epoxy resin (B) | | | 22 | 22 | 22 | 22 | 22 |
| Ratio of polyether polyol (C1)/polyether polyol (C2) | | | 20/80 | 20/80 | 20/80 | 20/80 | 20/80 |
| Ratio of liquid epoxy resin (B)/liquid acid anhydride (D) | | | 100/77 | 100/77 | 100/77 | 100/77 | 100/77 |
| Rate (%) of core shell polymer (F) per total amount | | | 4 | 4 | 4 | 4 | 4 |
| Thermal shock resistance index | | | >50 | >50 | >50 | 43 | 37 |
| Glass transition temperature (° C.) | | | 134 | 136 | 134 | 132 | 130 |

| Component | | Product name or Feature | Example 11 | Comparative Example 4 |
|---|---|---|---|---|
| Silica powder (A) | A-1 | CRYSTALITE CMC-12S | 50 | 50 |
| Liquid epoxy resin (B) | B-1 | jER828EL | 14 | 23 |
| Polyether polyol (C) | C1-1 | ACTCOL D-1000 | 5 | 1 |
| | C1-2 | ACTCOL D-2000 | | |
| | C1-3 | PTMG1000 | | |
| | C1-4 | ACTCOL T-1000 | | |
| | C2-1 | ACTCOL D-3000 | | 4 |
| | C2-2 | ACTCOL D-4000 | | |
| | C2-3 | ACTCOL T-3000 | | |
| Liquid acid anhydride (D) | D-1 | MTHPA | 17.8 | 17.8 |
| Curing accelerator (E) | E-1 | CUREZOL 2E4MZ | 0.2 | 0.2 |
| Core shell polymer (F) | G-1 | F-1 Core content 93% by weight | 13 | |
| *Dispersion (G-1) | | MEK insoluble content 98% by weight | | |
| (F-1) content of 30% by weight | | | | |
| (B-1) content of 70% by weight | | | | |
| Total formulated parts (parts) | | | 100 | 96 |
| Parts of polyether polyol (C) per 100 parts of liquid epoxy resin (B) | | | 22 | 22 |
| Ratio of polyether polyol (C1)/polyether polyol (C2) | | | 100/0 | 20/80 |
| Ratio of liquid epoxy resin (B)/liquid acid anhydride (D) | | | 100/77 | 100/77 |
| Rate (%) of core shell polymer (F) per total amount | | | 4 | 0 |
| Thermal shock resistance index | | | 20 | 10 |
| Glass transition temperature (° C.) | | | 110 | 134 |

From the results of Table 3, a cured product obtained from the epoxy resin composition for casting of the present invention had a glass transition temperature of 110° C. or more and high thermal shock resistance.

Examples 12 to 16

Each of the components was weighed according to a formulation shown in Table 4, and these components were homogeneously mixed by using stirring equipment (planetary centrifugal mixer, Awatori Rentaro, manufactured by Thinky). The mixture was defoamed under reduced pressure to obtain an epoxy resin composition for casting. The obtained composition was cured at 90° C. for three hours, and at 130° C. for three hours to prepare a cured product. The thermal shock resistance and a glass transition temperature were evaluated by using the cured product obtained. Results are shown in Table 4.

TABLE 4

| Component | | Product name or Feature | Example 12 | Example 13 | Example 14 | Example 15 | Example 16 |
|---|---|---|---|---|---|---|---|
| Silica powder (A) | A-1 | CRYSTALITE CMC-12S | 50 | 50 | 50 | 50 | 50 |
| Liquid epoxy resin (B) | B-1 | jER828EL | 14 | 14 | 23 | 14 | 14 |
| Polyether polyol (C) | C1-2 | ACTCOL D-2000 | 1 | 1 | 1 | 0.6 | 1.4 |
| | C2-1 | ACTCOL D-3000 | 4 | 24.5 | 4 | 2.4 | 5.6 |
| Liquid acid anhydride (D) | D-1 | MTHPA | 17.8 | 17.8 | 17.8 | 17.8 | 17.8 |
| Curing accelerator (E) | E-1 | CUREZOL 2E4MZ | 0.2 | 0.2 | 0.2 | 0.2 | 0.2 |
| Core shell polymer (F) | G-2 | F-2 Core content 85% by weight | 13 | | | 13 | 13 |
| *Dispersion (G) | | MEK insoluble content 98% by weight | | | | | |

TABLE 4-continued

| Component | | Product name or Feature | Example 12 | Example 13 | Example 14 | Example 15 | Example 16 |
|---|---|---|---|---|---|---|---|
| (F) content of 30% by weight (B-1) content of 70% by weight | G-3 | F-3 Core content 85% by weight MEK insoluble content 98% by weight | | 13 | | | |
| | F-6 | Paraloid EXL-2655 Core content 70% by weight MEK insoluble content 95% by weight | | | | 4 | |
| Total formulated parts (parts) | | | 100 | 100 | 100 | 100 | 100 |
| Parts of polyether polyol (C) per 100 parts of liquid epoxy resin (B) | | | 22 | 22 | 22 | 22 | 22 |
| Ratio of polyether polyol (C1)/polyether polyol (C2) | | | 20/80 | 20/80 | 20/80 | 20/80 | 20/80 |
| Ratio of liquid epoxy resin (B)/liquid acid anhydride (D) | | | 100/77 | 100/77 | 100/77 | 100/77 | 100/77 |
| Rate (%) of core shell polymer (F) per total amount | | | 4 | 4 | 4 | 4 | 4 |
| Thermal shock resistance index | | | >50 | 43 | 37 | 47 | 47 |
| Glass transition temperature (° C.) | | | 137 | 137 | 137 | 140 | 135 |

From the results of Table 4, a cured product obtained from the epoxy resin composition for casting of the present invention had a glass transition temperature of 130° C. or more and high thermal shock resistance.

Examples 17 to 18

Comparative Examples 5 to 6

Each of the components was weighed according to a formulation shown in Table 5, and these components were homogeneously mixed by using stirring equipment (planetary centrifugal mixer, Awatori Rentaro, manufactured by Thinky). The mixture was defoamed under reduced pressure to obtain an epoxy resin composition for casting. The obtained composition was cured at 100° C. for three hours, and at 150° C. for three hours to prepare a cured product. The thermal shock resistance and a glass transition temperature were evaluated by using the cured product obtained. Results are shown in Table 5.

TABLE 5

| Component | | Product name or Feature | Example 17 | Example 18 | Comparative Example 5 | Comparative Example 6 |
|---|---|---|---|---|---|---|
| Silica powder (A) | A-2 | MILLISIL M10 | 63 | 63 | 63 | 63 |
| Liquid epoxy resin (B) | B-2 | Epikote 862 | 12.6 | 12.6 | 12.6 | 12.6 |
| Polyether polyol (C) | C1-2 | ACTCOL D-2000 | 0.2 | 0.2 | | |
| | C2-1 | ACTCOL D-3000 | 1.8 | 1.8 | | |
| Liquid acid anhydride (D) | D-2 | RIKACID MH700 | 15.2 | 15.2 | 15.2 | 15.2 |
| Curing accelerator (E) | E-2 | HISHICOLIN PX-4ET | 0.2 | 0.2 | 0.2 | 0.2 |
| Core shell polymer (F) *Dispersion (G) | G-4 | F-4 Core content 85% by weight MEK insoluble content 96% by weight | | | 7 | 7 |
| (F) content of 30% by weight (B-2) content of 70% by weight | G-5 | F-5 Core content 85% by weight MEK insoluble content 98% by weight | 7 | | | 7 |
| Total formulated parts (parts) | | | 100 | 100 | 98 | 98 |
| Parts of polyether polyol (C) per 100 parts of liquid epoxy resin (B) | | | 11 | 11 | 0 | 0 |
| Ratio of polyether polyol (C1)/polyether polyol (C2) | | | 10/90 | 10/90 | | |
| Ratio of liquid epoxy resin (B)/liquid acid anhydride (D) | | | 100/87 | 100/87 | 100/87 | 100/87 |
| Rate (%) of core shell polymer (F) per total amount | | | 2 | 2 | 2 | 2 |
| Thermal shock resistance index | | | >50 | 35 | 20 | 10 |
| Glass transition temperature (° C.) | | | 140 | 140 | 147 | 147 |

From the results of Table 5, a cured product obtained from the epoxy resin composition for casting of the present invention had a glass transition temperature of 130° C. or more and high thermal shock resistance.

The invention claimed is:

1. An epoxy resin composition for casting, comprising:
a silica powder;
a liquid epoxy resin;
a polyol blend comprising a first polyether diol having an average molecular weight of not less than 400 and less than 2500, wherein the first polyether diol is at least one selected from the group consisting of polypropylene glycol and polytetramethylene glycol, and a second polyether diol having an average molecular weight of not less than 2500 and not more than 5000, wherein the second polyether diol is at least one selected from the group consisting of polypropylene glycol and polytetramethylene glycol, and wherein the second polyether polyol is included in an amount of from 50 to 90% by weight per 100% by weight of the sum of the first polyether diol and the second polyether diol;
a liquid acid anhydride;
a curing accelerator; and
a core shell polymer.

2. The epoxy resin composition for casting according to claim 1, wherein an amount of the polyol blend is from 10 to 30 parts by weight per 100 parts by weight of the liquid epoxy resin.

3. The epoxy resin composition for casting according to claim 2, wherein an amount of a core layer of the core shell polymer is from 80 to 95% by weight, and a methyl ethyl ketone insoluble content in the core shell polymer is 95% by weight or more.

4. The epoxy resin composition for casting according to claim 1, wherein at least one selected from the group consisting of the first polyether diol and the second polyether diol is polypropylene glycol.

5. The epoxy resin composition for casting according to claim 1, wherein an amount of a core layer of the core shell polymer is from 80 to 95% by weight, and a methyl ethyl ketone insoluble content in the core shell polymer is 95% by weight or more.

6. The epoxy resin composition for casting according to claim 5, wherein the core layer of the core shell polymer is at least one selected from the group consisting of diene rubber, siloxane rubber, and (meth)acrylate rubber.

7. The epoxy resin composition for casting according to claim 1, wherein particles of the core shell polymer are dispersed as primary particles.

8. The epoxy resin composition for casting according to claim 1, wherein an amount of the silica powder is from 40 to 85% by weight per 100% by weight of the sum of the silica powder, the liquid epoxy resin, the polyol blend, the liquid acid anhydride, the curing accelerator, and the core shell polymer.

9. The epoxy resin composition for casting according to claim 1, wherein an amount of the core shell polymer is from 0.3 to 10% by weight per 100% by weight of the sum of the silica powder, the liquid epoxy resin, the polyol blend, the liquid acid anhydride, the curing accelerator, and the core shell polymer.

10. The epoxy resin composition for casting according to claim 1, wherein an amount of the silica powder is from 40 to 85% by weight and an amount of the core shell polymer is from 0.3 to 10% by weight, per 100% by weight of the sum of the silica powder, the liquid epoxy resin, the polyol blend, the liquid acid anhydride, the curing accelerator, and the core shell polymer, and
   an amount of the polyol blend is from 10 to 30 parts by weight per 100 parts by weight of the liquid epoxy resin.

11. The epoxy resin composition for casting according to claim 1, wherein an amount of the liquid epoxy resin is from 10 to 50% by weight per 100% by weight of the epoxy resin composition.

12. The epoxy resin composition for casting according to claim 1, wherein the first polyether diol has an average molecular weight of not less than 800 and less than 2500.

13. A cured product, obtained by curing the epoxy resin composition for casting according to claim 1.

14. A coil protected with the cured product according to claim 13.

15. An electrical or electric equipment, comprising:
the coil according to claim 14.

16. A solid insulated switching device, comprising:
an electric insulating part comprising the cured product according to claim 13.

17. An epoxy resin composition for casting, comprising:
a silica powder;
a liquid epoxy resin;
a polyol blend comprising a first polyether triol having an average molecular weight of not less than 400 and less than 2500, wherein the first polyether triol is at least one polyoxypropylene glyceryl ether, and a second polyether diol having an average molecular weight of not less than 2500 and not more than 5000, wherein the second polyether diol is at least one selected from the group consisting of polypropylene glycol and polytetramethylene glycol, and wherein the second polyether diol is included in an amount of from 50 to 90% by weight per 100% by weight of the sum of the first polyether triol and the second polyether diol;
a liquid acid anhydride;
a curing accelerator; and
a core shell polymer.

18. An epoxy resin composition for casting, comprising:
a silica powder;
a liquid epoxy resin;
a polyol blend comprising a first polyether diol having an average molecular weight of not less than 400 and less than 2500, wherein the first polyether diol is at least one selected from the group consisting of polypropylene glycol and polytetramethylene glycol, and a second polyether triol having an average molecular weight of not less than 2500 and not more than 5000, wherein the second polyether triol is at least one polyoxypropylene glyceryl ether, and wherein the second polyether triol is included in an amount of from 50 o 90% by weight per 100% by weight of the sum of the first polyether diol and the second polyether triol;
a liquid acid anhydride;
a curing accelerator; and
a core shell polymer.

* * * * *